(12) United States Patent
Takeda et al.

(10) Patent No.: US 9,767,547 B2
(45) Date of Patent: Sep. 19, 2017

(54) INSPECTION METHOD AND INSPECTION APPARATUS

(71) Applicant: NuFlare Technology, Inc., Yokohama (JP)

(72) Inventors: Masaya Takeda, Kanagawa (JP); Ikunao Isomura, Kanagawa (JP)

(73) Assignee: NuFlare Technology, Inc., Yokohama (JP)

( * ) Notice: Subject to any disclaimer, the term of this patent is extended or adjusted under 35 U.S.C. 154(b) by 0 days.

(21) Appl. No.: 14/228,448

(22) Filed: Mar. 28, 2014

(65) Prior Publication Data
US 2014/0294283 A1    Oct. 2, 2014

(30) Foreign Application Priority Data
Apr. 1, 2013   (JP) ................................ 2013-075922

(51) Int. Cl.
*G06T 7/00*        (2017.01)

(52) U.S. Cl.
CPC ............ *G06T 7/001* (2013.01); *G06T 7/0004* (2013.01); *G06T 2207/30148* (2013.01)

(58) Field of Classification Search
CPC .................. G06T 7/0004; G06T 7/001; G06T 2207/30148
See application file for complete search history.

(56) References Cited

U.S. PATENT DOCUMENTS

| 2008/0036899 | A1* | 2/2008 | Yamashita | 348/340 |
| 2013/0028505 | A1* | 1/2013 | Dmitriev et al. | 382/144 |
| 2013/0044205 | A1  | 2/2013 | Matsumoto | |
| 2013/0108146 | A1* | 5/2013 | Li | H01L 22/12 382/144 |

FOREIGN PATENT DOCUMENTS

| JP | 06-294750 | 10/1994 |
| JP | 2003-214820 | 7/2003 |
| JP | 2004-077390 | 3/2004 |

(Continued)

OTHER PUBLICATIONS

U.S. Appl. No. 14/529,297, filed Oct. 31, 2014, Isomura, et al.
(Continued)

*Primary Examiner* — Utpal Shah
(74) *Attorney, Agent, or Firm* — Oblon, McClelland, Maier & Neustadt, L.L.P.

(57) ABSTRACT

An inspection method and apparatus comprising, acquiring a plurality of optical images of a sample in which a plurality of dies having repetitive pattern are provided, comparing the optical images to each other by a die-to-die method and detecting a defect, obtaining at least one of a dimension difference and a dimension ratio between the repetitive pattern of the optical image to be inspected and the repetitive pattern of the optical image to be reference in the die-to-die method, extracting a die of the optical image having the dimension difference or dimension ratio closest to that at a defect position of a die of the optical image in which the defect is detected, compared, and stored, and determining that the defect does not exist in the optical image when the defect is not detected from the optical image in which the defect is originally detected.

10 Claims, 9 Drawing Sheets

(56) References Cited

FOREIGN PATENT DOCUMENTS

| JP | 2008-040370 | 2/2008 |
|----|-------------|--------|
| JP | 4236825     | 3/2009 |
| JP | 2012-173072 | 9/2012 |
| JP | 2013-040873 | 2/2013 |

OTHER PUBLICATIONS

U.S. Appl. No. 14/529,358, filed Oct. 31, 2014, Isomura, et al.
Notice of Allowance issued Jun. 6, 2017 in Japanese Patent Application No. 2013-075922.

* cited by examiner

INSPECTION METHOD AND INSPECTION APPARATUS

CROSS-REFERENCE TO THE RELATED APPLICATION

The entire disclosure of the Japanese Patent Application No. 2013-075922, filed on Apr. 1, 2013 including specification, claims, drawings, and summary, on which the Convention priority of the present application is based, are incorporated herein in their entirety.

FIELD OF THE INVENTION

The present invention relates to an Inspection Method and Inspection Apparatus.

With high integration and large capacity of a Large Scale Integration (LSI), a circuit dimension required for a semiconductor element becomes increasingly narrowed. For example, a pattern having a line width of several tens of nanometers is required to be formed in the latest typical logic device.

It is necessary to improve a production yield of the expensive LSI in a production process. In the semiconductor element, during a production process, an original graphic pattern (that is, a mask or a reticle, hereinafter collectively referred to as a mask) in which a circuit pattern is formed is exposed and transferred onto a wafer by a reduction projection exposure apparatus called a stepper or a scanner. A shape defect of a mask pattern can be cited as a large factor that reduces a production yield of the semiconductor element.

The finer the dimensions of an LSI pattern formed on the wafer becomes, the finer the shape defect of the mask pattern becomes. As fluctuations of various process conditions are absorbed by enhancing dimensional accuracy of the mask, it is necessary to detect the defect of the extremely small pattern in a mask inspection. At this point, it is also necessary to determine the defect in consideration of the fluctuation in line width dimension or position shift amount of the pattern in a mask surface. For example, Japanese Patent No. 4236825 discloses an inspection apparatus that can detect the fine defect in the mask.

The conventional mask inspection is intended to detect the shape defect of the pattern, and a defect determination algorithm suitable for the detection of the shape defect of the pattern and a defect recording method are devised. In the mask inspection apparatus, a function of detecting the defect caused by the fluctuation in line width of the pattern is improved in order to meet a challenge of a lack of an LSI production margin caused by the fluctuation in line width. However, in a contemporary mask pattern the shape defect or the dimension of the defect determined to be the cause of the fluctuation in line width becomes substantially equal to the fluctuation in line width (line width distribution) in the whole surface of the mask. Therefore, the number of detected defects becomes large.

On defect detection technique is a die-to-die comparison method. When chips in regions having different dimensions are compared to each other, the patterns having dimension biases (deviations) are compared to each other. For this reason, sometimes the shape or line width that is not required to be detected as the defect, is determined to be the defect.

An object of the invention is to provide an inspection method and apparatus, able to reduce the detection of the unnecessary defect.

Other challenges and advantages of the present invention are apparent from the following description.

SUMMARY OF THE INVENTION

According to one aspect of the present invention, an inspection method comprising, acquiring a plurality of optical images of a sample in which a plurality of dies having repetitive pattern are provided, comparing the optical images to each other by a die-to-die method and detecting an optical image having a defect, obtaining at least one of a dimension difference and a dimension ratio between the repetitive pattern of the optical image to be inspected and the repetitive pattern of the optical image to be reference in the die-to-die method, extracting a die of the optical image having the dimension difference or dimension ratio closest to that at a defect position of a die of the optical image in which the defect is detected, and comparing the optical image in which the defect is detected and the optical image of the die having the dimension difference or dimension ratio closest to that at the defect position of the die of the optical image by the die-to-die method, storing information on the defect when the defect is detected again from the optical image in which the defect is originally detected, and determining that the defect does not exist in the optical image when the defect is not detected from the optical image in which the defect is originally detected.

Further to this aspect of the present invention the inspection method, wherein in acquiring the optical image of the sample, the sample is virtually divided into a plurality of stripes along an X-axis direction or a Y-axis direction, and the sample is placed on an XY-table movable in the X-axis direction and the Y-axis direction the XY-table is moved such that the stripe is continuously scanned, and in extracting the die having the dimension difference or dimension ratio closest to that at the defect position of the die of the optical image in which the defect is detected, the die located in the same direction as at least one of the X-axis direction and the Y-axis direction of the die of the optical image in which the defect is detected is preferentially extracted.

Further to this aspect of the present invention the inspection method, further obtaining a dimension distribution of the repetitive pattern from at least one of the dimension difference and the dimension ratio, wherein the die having the dimension difference or dimension ratio closest to that at the defect position is extracted using the dimension distribution.

According to another aspect of the present invention, an inspection method comprising, acquiring a plurality of optical images of a sample in which a plurality of dies having repetitive pattern are provided, comparing the optical images of the repetitive pattern to each other by a die-to-die method, obtaining at least one of a dimension difference and a dimension ratio between the repetitive pattern of the optical image to be inspected and the repetitive pattern of the optical image to be reference in the die-to-die method, extracting the die having a closest distribution of the dimension difference or dimension ratio with respect to each of the plurality of dies, and comparing the optical image of each of the plurality of dies to each optical image of the die having the closest distribution of the dimension difference or dimension ratio by the die-to-die method, storing information on a defect when the defect is detected, and determining that the defect does not exist when the defect is not detected.

Further to this aspect of the present invention the inspection method, wherein in acquiring the optical image of the sample, the sample is virtually divided into a plurality of stripes along an X-axis direction or a Y-axis direction, and the sample is placed on an XY-table movable in the X-axis direction and the Y-axis direction the XY-table is moved such that the stripe is continuously scanned, and in extracting the die having the closest distribution of the dimension difference or dimension ratio, the die located in the same direction as each of the plurality of dies with respect to at least one of the X-axis direction and the Y-axis direction is preferentially extracted.

Further to this aspect of the present invention the inspection method, further comprising the step of obtaining a dimension distribution of the repetitive pattern from at least one of the dimension difference and the dimension ratio, wherein the die having the closest distribution of the dimension difference or dimension ratio is extracted using the dimension distribution.

Further to this aspect of the present invention the inspection method, wherein the dimension difference is a difference in line width between the repetitive patterns or a difference in inter-pattern distance between the repetitive patterns.

Further to this aspect of the present invention the inspection method, wherein the dimension difference is a difference in line width between the repetitive patterns or a difference in inter-pattern distance between the repetitive patterns.

Further to this aspect of the present invention the inspection method, wherein the dimension ratio is a ratio in line width between the repetitive patterns or a ratio in inter-pattern distance between the repetitive patterns.

Further to this aspect of the present invention the inspection method, wherein the dimension ratio is a ratio in line width between the repetitive patterns or a ratio in inter-pattern distance between the repetitive patterns.

According to another aspect of the present invention, an inspection apparatus comprising, an optical image acquisition unit that acquires an optical image of a sample, a first comparison unit that detects a defective optical image by comparing the optical images output from the optical image acquisition unit to each other by a die-to-die method, a dimension difference/dimension ratio acquisition unit that obtains at least one of a dimension difference and a dimension ratio between the pattern of the optical image and a pattern of the optical image compared to the optical image by the die-to-die method, a second comparison unit that compares the optical image in which the defect is detected by the first comparison unit and the optical image of the die having the dimension difference or dimension ratio closest to that at a defect position of the die of the optical image by the die-to-die method, and a controller that stores information on the defect by the comparison in the second comparison unit when the defect is detected again from the optical image in which the defect is originally detected by the first comparison unit, and determining that the defect does not exist in the optical image when the defect is not detected from the optical image in which the defect is originally detected by the first comparison unit.

Further to this aspect of the present invention, an inspection apparatus, further comprising a dimension distribution acquisition unit that obtains a dimension distribution of the pattern from at least one of the dimension difference and the dimension ratio, which are output from the dimension difference/dimension ratio acquisition unit, wherein the controller extracts the die having the dimension difference or dimension ratio closest to that at the defect position using the dimension distribution output from the dimension distribution acquisition unit and outputs the die to the second comparison unit.

DETAILED DESCRIPTION OF THE EMBODIMENTS

Embodiment 1

Figure 1:
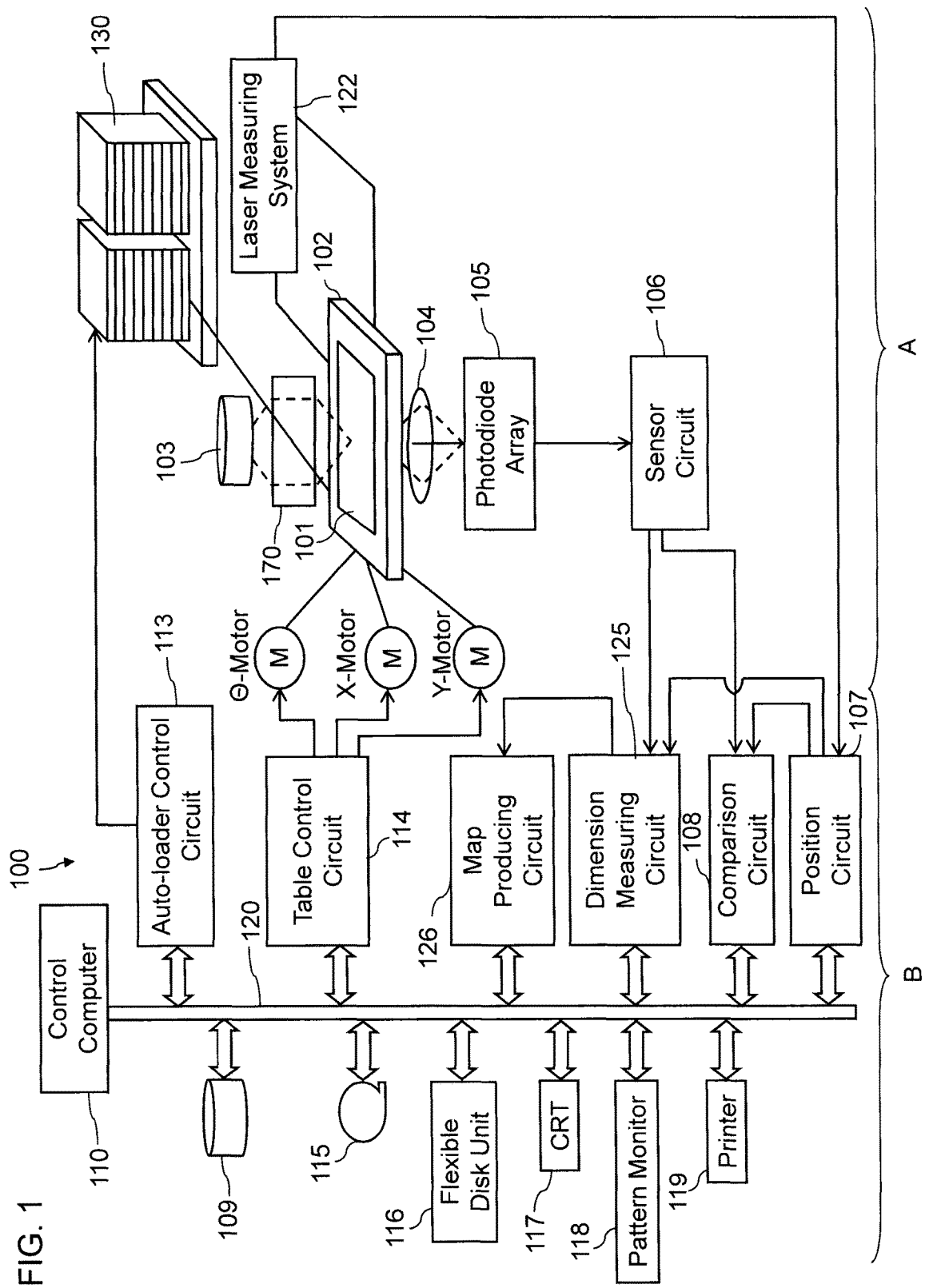
FIG. 1 is a schematic configuration diagram of an inspection apparatus according to a first embodiment and second embodiment.
Figure 2:
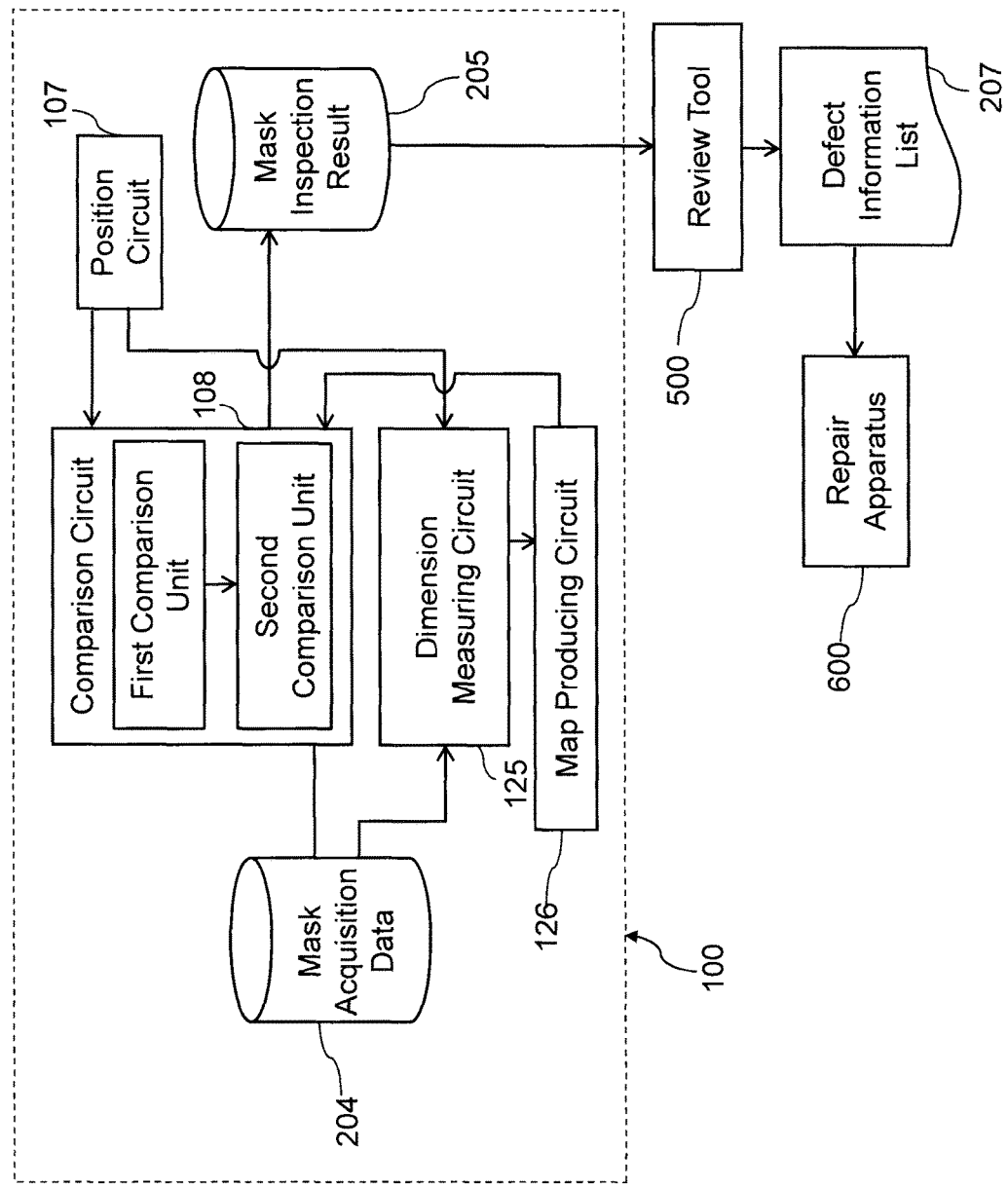
FIG. 2 is a view illustrating data flow in the inspection apparatus of FIG. 1.

FIG. 1 is a schematic configuration diagram of an inspection apparatus according to a first embodiment. FIG. 2 is a view illustrating data flow in the inspection apparatus of FIG. 1. In FIGS. 1 and 2, a configuration unit necessary in the first embodiment is illustrated. However, another well-known configuration unit necessary for an inspection may be used. As used herein, a "unit" or "circuit" can be configured as a program operating on a computer. Alternatively, the "unit" or "circuit" may be constructed as, not only the program that is software, but also a combination of software, hardware, or firmware. In the case that the "unit" or "circuit" may be constructed as the program, the program can be recorded in a recording device such as a magnetic disk drive.

In the first embodiment, a mask used in photolithography is used as an inspection target. Alternatively, as another example, a wafer may be used as the inspection target.

As illustrated in FIG. 1, the inspection apparatus 100 includes a configuration unit A that constitutes an optical image acquisition unit and a configuration unit B that performs processing necessary for an inspection using an optical image acquired by the configuration unit A.

The configuration unit A includes a light source 103, an XYθ-table 102 that is movable in a horizontal direction (X-direction and Y-direction) and a rotation direction (θ-direction), an illumination optical system 170 that constitutes a transmission illumination system, a magnification enlarging optical system 104, a photodiode array 105, a sensor circuit 106, a laser measuring system 122, and an autoloader 130.

In the configuration unit A, the mask acquisition data 204 of a mask 101 that becomes an inspection target is acquired. The mask acquisition data 204 is an image of a mask in which a graphic pattern is written based on graphic data included in design pattern data of the mask 101. For example, the mask acquisition data 204 is 8-bit data with no code, and expresses a gradation of brightness of each pixel.

The mask 101 is located on the XYθ-table 102. The mask 101 is irradiated with light from the light source 103 disposed above the XYθ-table 102. More specifically, the mask 101 is irradiated with a light emitted from the light source 103 through the illumination optical system 170. The enlarging optical system 104, the photodiode array 105, and the sensor circuit 106 are disposed below the mask 101. The light transmitted through the mask 101 forms the optical image on the photodiode array 105 via the enlarging optical system 104.

The enlarging optical system 104 may be configured such that a focal point is automatically adjusted by an automatic focusing mechanism (not illustrated). Although not illustrated, the inspection apparatus 100 may irradiate the mask 101 with light from below and guide the reflected light to the photodiode array through the enlarging optical system. In this case, the optical image of the transmitted light and reflected light can simultaneously be acquired.

The photodiode array 105 performs photoelectric conversion to the pattern image of the mask 101 formed on the photodiode array 105, and the sensor circuit 106 performs A/D (analog-digital) conversion to the pattern image. A sensor (not illustrated) is disposed in the photodiode array 105. A TDI (Time Delay Integration) sensor can be cited as an example of the sensor. In this case, the TDI sensor captures the image of the pattern on the mask 101 while the XYθ-table 102 moves continuously. At this point, the light source 103, the enlarging optical system 104, the photodiode array 105, and the sensor circuit 106 constitute a high-magnification inspection optical system.

In the configuration unit B, the control computer 110, that is, the controller controlling the whole of the inspection apparatus 100 is connected to a position circuit 107, a comparison circuit 108, that is an example of the comparison unit, a reference circuit 112, that is an example of the reference image producing unit, a dimension measuring circuit 125, that is an example of the dimension difference/dimension ratio acquisition unit, a map producing circuit 126, that is an example of the dimension distribution acquisition unit, an auto-loader control circuit 113, a table control circuit 114, a magnetic disk drive 109 that is an example of the storage device, a magnetic tape device 115, a flexible disk unit 116, a CRT 117, a pattern monitor 118, and a printer 119, through a bus 120 that constitutes a data transmission line. The XYθ-table 102 is driven by an X-axis motor, a Y-axis motor, and an θ-axis motor under the control of the table control circuit 114. An air slider, a linear motor, and a step motor are some examples of driving mechanisms that can be used, and can further be used in any combination with each other.

As described above, the "unit" or "circuit" in FIG. 1 can be configured as a program operating on the computer. Alternatively, the "unit" or "circuit" may be constructed as not only a program, that is, software, but also a combination of software, hardware, or firmware. In the case that the "unit" or "circuit" may be constructed as a program, the program can be recorded in the magnetic disk drive 109. For example, each of the auto-loader control circuit 113, the table control circuit 114, the comparison circuit 108, and the position circuit 107 may be constructed as an electric circuit, software that can be processed by the control computer 110, or by the combination of the electric circuit and the software.

The control computer 110 controls the table control circuit 114 to drive the XYθ-table 102. A moving position of the XYθ-table 102 is measured by the laser measuring system 122, and transmitted to the position circuit 107.

The control computer 110 controls the auto-loader control circuit 113 to drive the auto-loader 130. The auto-loader 130 automatically conveys the mask 101, notifies an operator of an end of the inspection process, reviews a defect as needed, and automatically discharges the mask 101.

The inspection is performed by die-to-die comparison method in the comparison circuit 108. In the die-to-die comparison method, in the case that multiple chips having identical pattern configurations are disposed in a part, or the whole of the identical mask, the optical images of the different masks having the identical pattern in chips are compared to each other. Usually many patterns, which are transferred to the semiconductor wafer, of the same integrated circuit are repeatedly formed in the mask that becomes the inspection target. A repetitive unit has a rectangular shape having the same dimension and is referred to as a die when cut off from one another. Usually one-unit integrated circuit is formed in one die. The terms "the chip" and "the die" are usually used for the same meaning.

Figure 3:
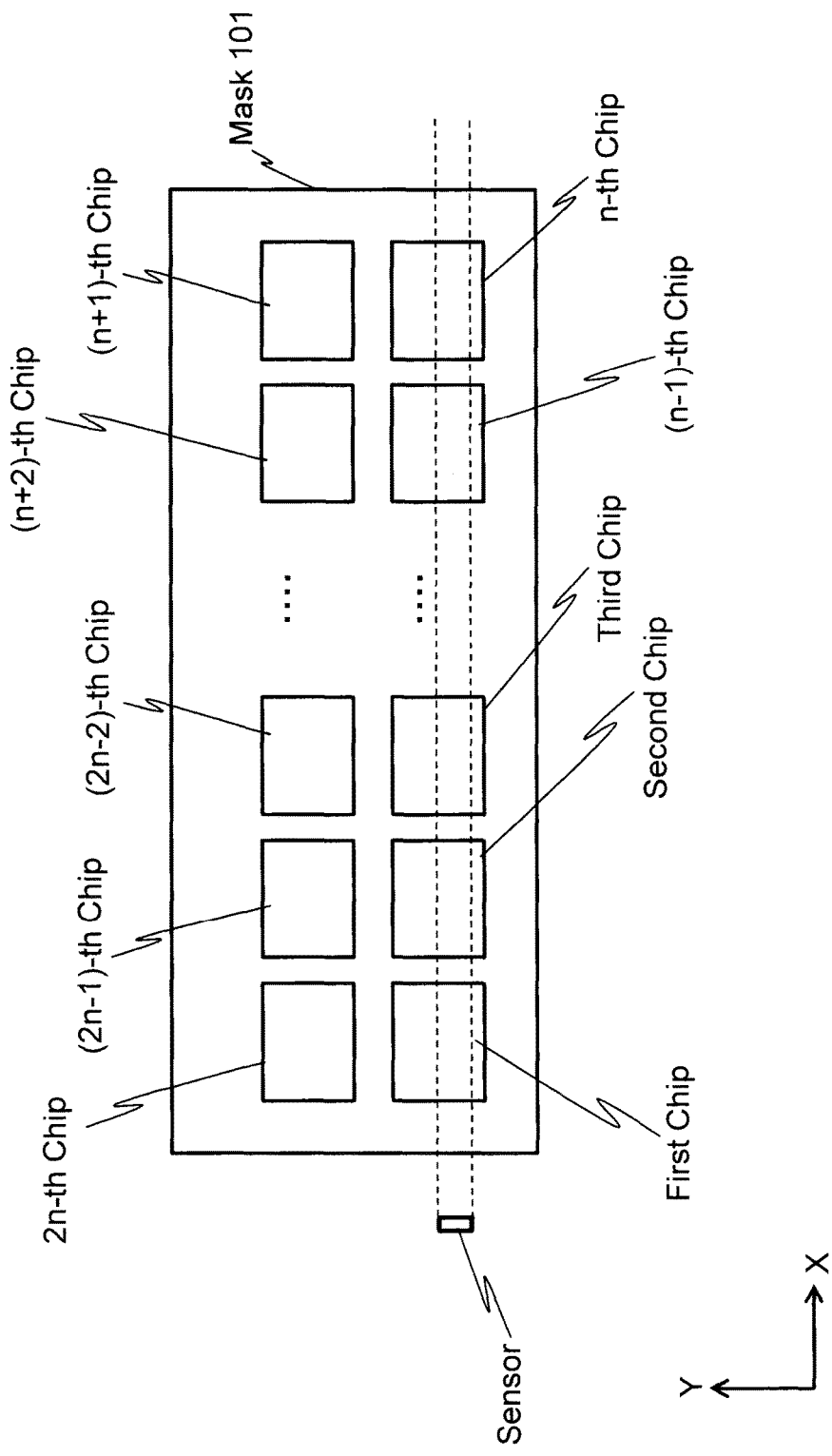
FIG. 3 is a partially enlarged schematic diagram illustrating the repetitive pattern formed on the mask.

FIG. 3 is a partially enlarged schematic diagram illustrating the repetitive pattern formed on the mask 101. For example, it is assumed that a plurality of chip patterns are formed in the mask 101. In the die-to-die comparison method, when the n-th chip is considered as an inspection target, the (n−1)-th chip is an optical image used as the reference image.

The optical image that becomes the inspection target and the optical image that becomes the reference image are compared to each other using the proper comparison determination algorithm. In the configuration of FIG. 1, transmission images are compared to each other. In a configuration in which a reflection optical system is used, reflection images are compared to each other, or a comparison determination algorithm in which transmission and reflection are combined is used. As a result of the comparison, in the case that a difference between the two exceeds a predetermined threshold, the position is determined to be the defect.

For example, when the optical image of the n-th chip and the optical image of the (n−1)-th chip are compared to each other, it is expected that the optical images are identical unless a defect exists. Accordingly, in a difference image of the optical image of the n-th chip and the optical image of the (n−1)-th chip, a spot having a large difference amount can be extracted as the defect. At this point, when the two optical images are compared to each other it is impossible to determine which die has the defect. Therefore, the comparison is performed using at least three optical images having the same pattern, and the die having the defect is decided by majority. For example, the (n−2)-th chip and the (n−1)-th chip are compared to each other, and the (n−1)-th chip and the n-th chip are compared to each other, which specifies the chip having the defect.

In the first embodiment, the mask acquisition data 204 is also transmitted to the dimension measuring circuit 125. In the dimension measuring circuit 125, for example, the CD (Critical Dimension) of the line pattern written on the mask 101 is measured from the mask acquisition data 204. When the pattern is a line pattern the line width of the line pattern is measured. The pattern dimension difference (ΔCD) between the optical image that becomes the inspection target and the optical image that becomes the reference is measured by the die-to-die comparison method. The reference circuit 112 transmits the reference data to the dimension measuring circuit 125, and the position circuit 107 transmits the data indicating the position on the mask 101 on the XYθ-table 102 to the dimension measuring circuit 125. In the dimension measuring circuit 125, the line width of the pattern corresponding to the line pattern is measured from the reference data. The dimension difference or dimension ratio between the pattern line width of the optical image and the pattern line width of the reference image is obtained based on the measured value.

The pattern dimension measurement in the dimension measuring circuit 125 is performed concurrently with the acquisition of the optical image of the mask 101. Alternatively, for example, the pattern dimension measurement in the dimension measuring circuit 125 may be performed concurrently with the inspection performed by the comparison circuit 108.

The data of the ΔCD, which is obtained by the dimension measuring circuit 125, is transmitted to the map producing circuit 126, that is, the dimension distribution acquisition unit. In the map producing circuit 126, for example, a map of the critical dimension difference (ΔCD map) of the pattern line width in the surface on the mask 101 is produced based on the ΔCD. The produced ΔCD map is stored in the magnetic disk drive 109. The inspection apparatus 100 does not necessarily include the map producing circuit 126, but the dimension measuring circuit 125 may have the map producing function, or an external computer may produce the map. Alternatively, a re-inspection may be made by the ΔCD value, which is obtained by the dimension measuring circuit 125, without producing the map.

An example of a method for inspecting the mask 101 with the inspection apparatus 100 in FIG. 1 will be described below.

(Optical Image Acquisition Process)

Figure 4:
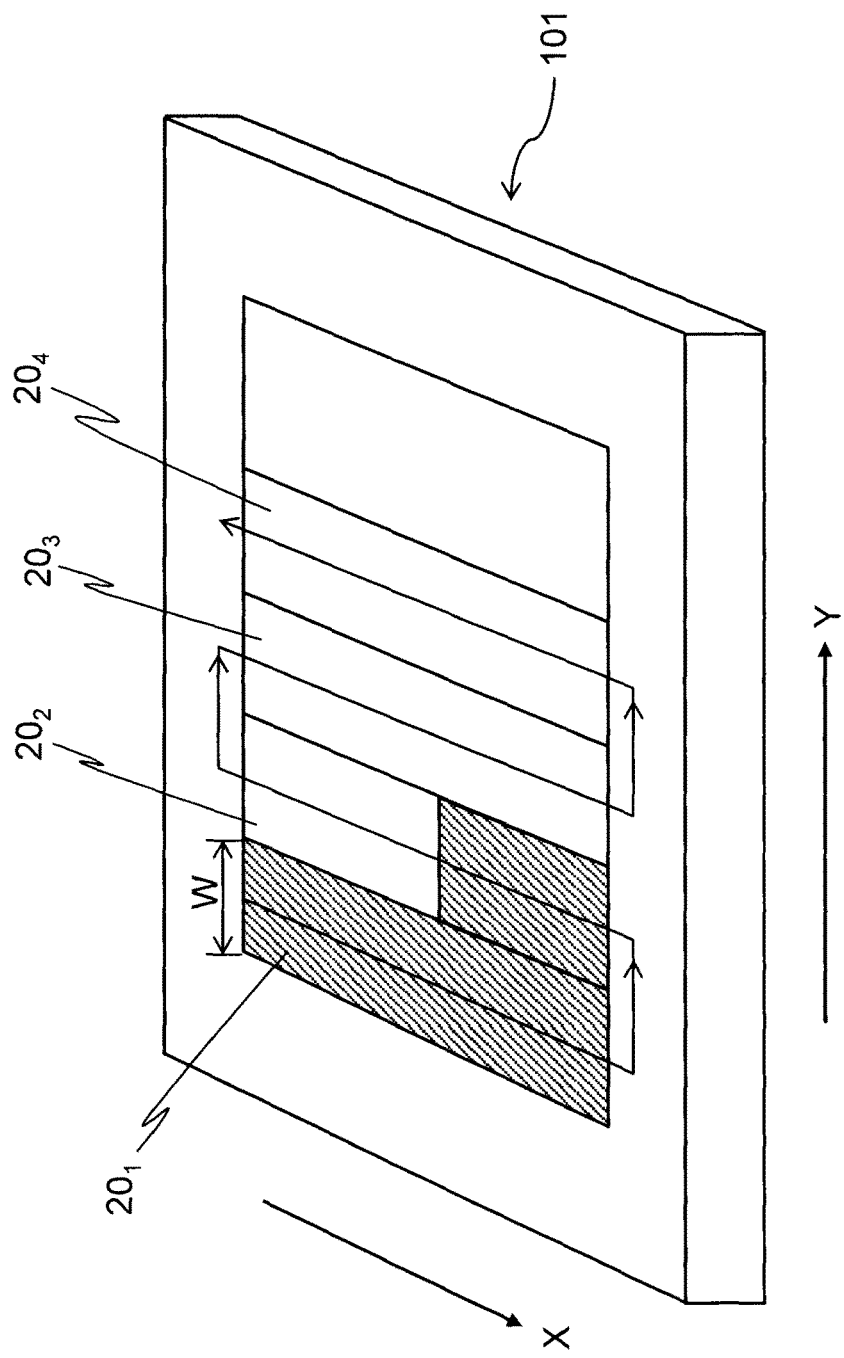
FIG. 4 is a view illustrating an optical image acquiring procedure.

In the configuration unit A in FIG. 1 the optical image of the mask 101 is acquired. FIG. 4 is a view illustrating an optical image acquiring procedure. As described above, the optical image corresponds to the mask acquisition data 204 in FIG. 2.

In FIG. 4, the mask 101 is positioned on the XYθ-table 102 in FIG. 1. The inspection region on the mask 101 is virtually divided into the strip-shaped multiple inspection regions, namely, stripes $20_1$, $20_2$, $20_3$, $20_4$, . . . as illustrated in FIG. 4. For example, each stripe is a region having the width of several hundred micrometers and the length of about 100 mm corresponding to the total length in the X-direction or Y-direction of the mask 101.

The optical image is acquired in each stripe. That is, in acquiring the optical image in FIG. 4, the operation of the XYθ-table 102 is controlled such that the each stripe $20_1$, $20_2$, $20_3$, $20_4$, . . . is continuously scanned. Specifically, the optical image on the mask 101 is acquired while the XYθ-table 102 moved in the −X-direction of FIG. 4. The image having a scan width W in FIG. 4 is continuously input to the photodiode array 105 in FIG. 1. That is, the image of the second stripe $20_2$ is acquired after the image of the first stripe $20_1$ is acquired. In this case, after the XYθ-table 102 moves in the −Y-direction in a stepwise manner, the optical image is acquired while the XYθ-table 102 moves in the direction (X-direction) opposite to the direction (−X-direction) in which the image of the first stripe $20_1$ is acquired, and the image having the scan width W is continuously input to the photodiode array 105. In the case that the image of the third stripe $20_3$ is acquired, after moving in the −Y-direction in the stepwise manner, the XYθ-table 102 moves in the direction opposite to the direction (X-direction) in which the image of the second stripe $20_2$ is acquired, namely, the direction (−X-direction) in which the image of the first stripe $20_1$ is acquired. An arrow in FIG. 4 indicates the optical image acquiring direction and sequence, and a hatched portion indicates the region where the optical image is already acquired.

FIG. 3 illustrates a state in which the optical image is being acquired. In FIG. 3, 2n chip patterns are formed in a predetermined region on the mask 101. The sensor captures the image of the pattern along the X-direction in the order of the first chip, the second chip, the third chip, . . . , (n−1)-th chip, and n-th chip. After the n-th chip is acquired, the sensor is seemingly moved along the Y-direction, next, the sensor captures the image of the pattern in the order of (n+1)-th chip, (n+2)-th chip, . . . , (2n−2)-th chip, (2n−1)-th chip, and 2n chip.

The photodiode array 105 performs the photoelectric conversion to the pattern image formed on the photodiode array 105 in FIG. 1, and the sensor circuit 106 performs the A/D (analog-digital) conversion to the pattern image. Then the optical image, that is, mask acquisition data 204 is transmitted from the sensor circuit 106 to the comparison circuit 108 in FIG. 1.

(Die-to-Die Comparison Process)

The comparison circuit 108 includes the first comparison unit and the second comparison unit. In the second embodiment, firstly, the first comparison unit compares the mask acquisition data 204 to each other by the die-to-die method. Specifically, the data that becomes the inspection target and the data that becomes the reference of the defect determination are compared to each other using the proper comparison determination algorithm. The data that becomes the inspection target is determined to be the defect in the case that the difference between the two exceeds the predetermined threshold.

For example, it is assumed that a lattice-shaped chip pattern is formed in the mask 101. In the die-to-die comparison method, the chips repetitively formed in the mask are compared to each other. For example, the n-th chip is considered as the inspection target. The n-th chip is determined to be the defect in the case that the pattern difference between the optical image of the n-th chip and the optical image of the (n−1)-th chip exceeds the predetermined threshold. For the determination of the defect, the comparison using more than three chips is required. For example, the (n−2)-th chip is compared with the (n−1)-th chip, then the (n−1)-th chip is compared with the n-th chip. Therefore it is possible to determine if the n-th chip is the defect.

(Dimension Measurement Process)

In the dimension measurement process, the critical dimension (CD) of the pattern, which is written on the mask 101, is measured based on the mask acquisition data. The critical dimension difference (ΔCD) between the pattern of the optical image to be inspected and the pattern of the optical image to be a reference in the die-to-die method is then obtained. In the inspection apparatus 100 shown in FIG. 1, the dimension measuring circuit 125 measures the critical dimension (CD) value of the pattern using the mask acquisition data 204 output from the sensor circuit 106, and obtains the critical dimension difference (ΔCD) of the pattern between the optical images using the critical dimension (CD) values. At this time, the positional information of the mask 101 positioned on the XYθ-table 102 that is sent from the position circuit 107, is included in the dimension difference. The critical dimension difference (ΔCD) of the pattern can be a difference in line width between the patterns, or can be a ratio in line width between the patterns. Further, the critical dimension difference (ΔCD) of the pattern can be a difference in inter-pattern distance between the patterns, or can be a ratio in inter-pattern distance between the patterns. A plurality of dimension differences can be obtained based on any combination of these.

During the inspection the frequency of measuring the critical dimension (CD) in the dimension measuring circuit 125 is performed, for example, every time a specific number of optical images (for example 1000 optical images) are acquired along the length direction (X direction) of the stripe ($20_1$, $20_2$, $20_3$, $20_4$, . . . ) shown in FIG. 4, and every time the same specific number of the optical images, that is, the same number as the optical images along the X direction, are acquired along the width direction (Y direction) of the stripe. An interval of a pair of edges, that is, a line width of an appropriate line pattern can be used as the measurement point. It is preferable that the critical dimension (CD) value be obtained using a plurality of a pair of edges, the degrees of the dimension values are then determined and the highest frequency based on the result of the count of the distribution of the degrees, is used as a representative value. When no pairs of edges or very few pairs of edges can be found around a measurement point, the measurement of the critical dimension (CD) value may not be performed, or the highest frequency based on the limited dimension values may be used as the representative value.

When obtaining the critical dimension difference (ΔCD) of the pattern the dimension measuring circuit 125 transmits the obtained data to the map producing circuit 126. The map producing circuit 126 produces a ΔCD map expressing a dimension distribution in a mask plane from accumulated ΔCD values. In the inspection region of the mask 101, the region where the line width of the pattern is narrowed or the region where the line width is widened can easily be understood from the ΔCD map. For example, when the line width tends to be narrowed in a specific portion of the mask using a drawing apparatus used to draw the pattern this tendency can be understood. The die having the ΔCD value identical or similar to that of the die that becomes the inspection target can be searched using the ΔCD map. The die having the ΔCD value identical or similar to that of the detected defect position can also be searched.

In the die-to-die comparison method, because the separation of the dies is larger than a cell comparison method, the die-to-die comparison method is easily influenced by the dimension distribution in the surface of the mask. When the chips in the regions having the different dimensions are compared to each other, the patterns having dimension biases (deviations) are compared to each other, which results in a problem in that the shape or line width, which needs not to be detected, is detected as the defect.

Figure 5:
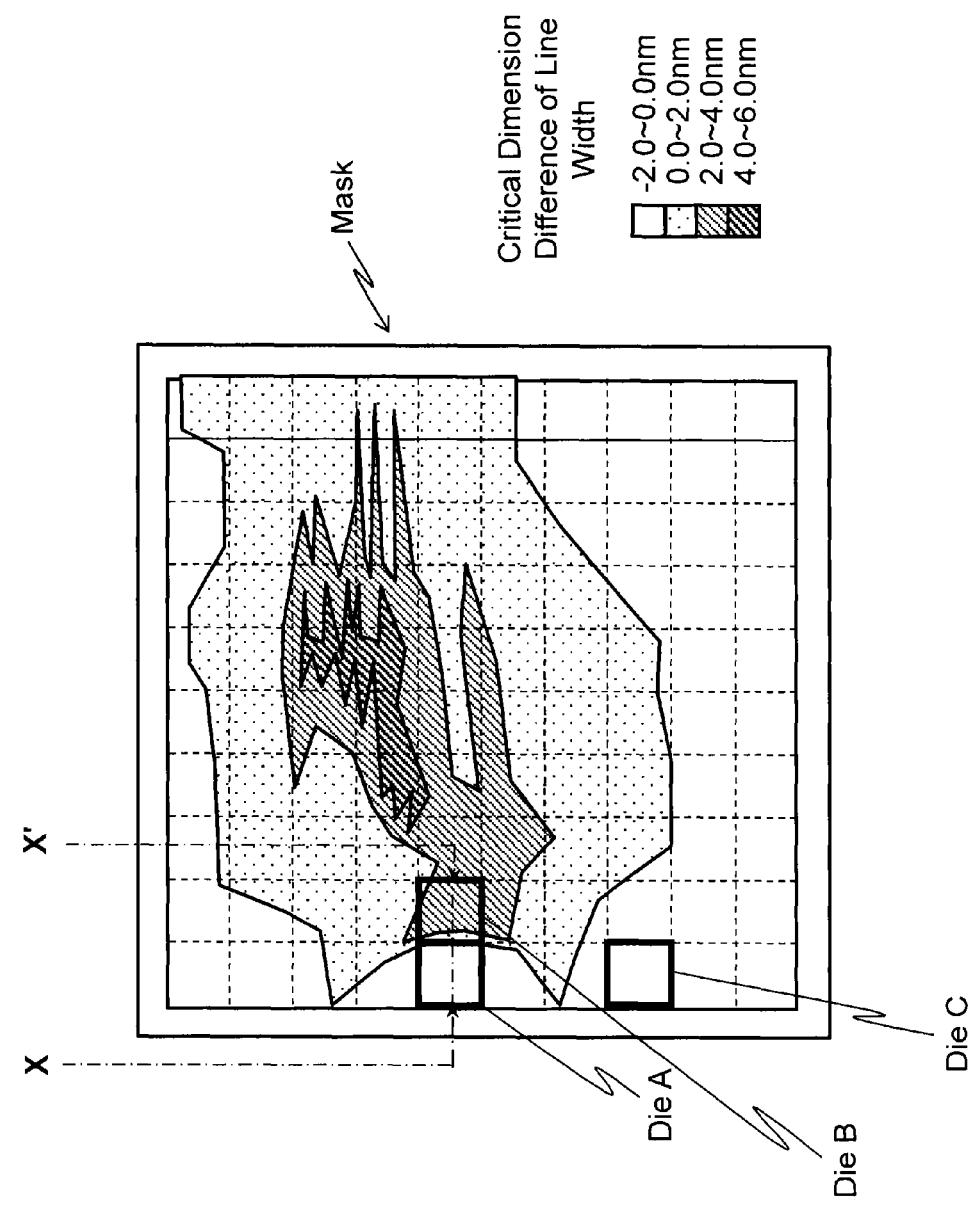
FIG. 5 illustrates an example of the CD (critical dimension) map of the mask.
Figure 6:
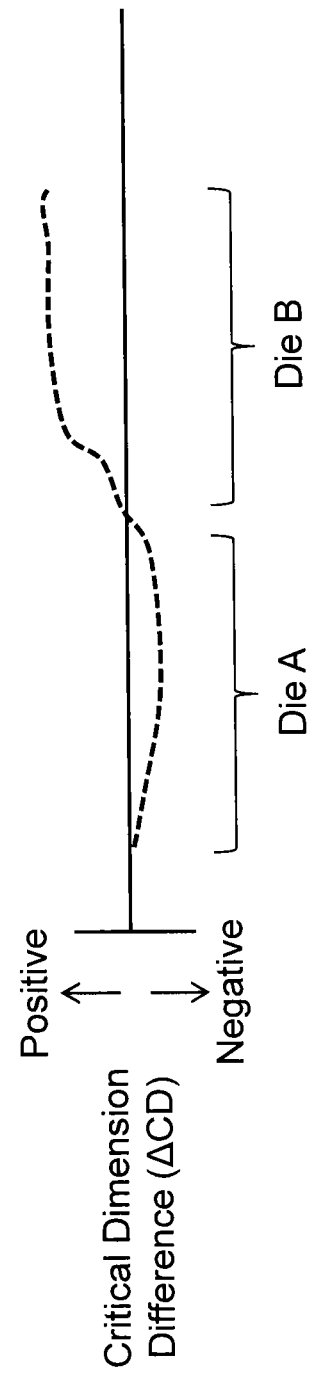
FIG. 6 is a view illustrating the dimension distribution corresponding to the section along a line X-X' in FIG. 5.

FIG. 5 illustrates an example of the CD map of the mask. The unit region surrounded by dotted lines indicates one die region. In the example in FIG. 5, the line width tends to be widened near the central portion, and the line width tends to be narrowed in a peripheral portion of the mask. FIG. 6 is a view illustrating the dimension distribution corresponding to the section along a line X-X' in FIG. 5.

In the die-to-die comparison method, the dies A and B in FIG. 5 are compared to each other. At this point, as illustrated in FIG. 6, the die A differs from the die B in the dimension distribution that is, the die A and the die B having the dimension biases (deviations) are compared to each other. When a fluctuation in dimension in the mask plane becomes substantially equal to the dimension of the defect that should be pointed out as the shape defect or the fluctuation in line width, sometimes the die A in which the defect to be originally detected does not exist is determined to be defective from the comparison with the die B due to the difference of the dimension distribution. For this reason, in such cases, the die A and the die B are not compared to each other, but the die A is suitably compared to a die C having the dimension distribution close to that of the die A.

Specifically, in order to determine whether the defect detected by the first comparison unit is one that should really be detected, the die having the dimension difference closest to that at the defect position is searched by referring to the ΔCD map, and the second comparison unit performs the die-to-die comparison again using the die having the dimension difference closest to that at the defect position. In the above example, when the die A is determined to be defective as a result of the comparison between the die A and the die B using the first comparison unit, the die C having the dimension difference closest to that at the defect position of the die A is extracted by referring to the ΔCD map in FIG. 5. Then the second comparison unit performs a re-inspection by comparing the die A to the die C. When the die A is determined to be defective as a result of the re-inspection the defect is stored as the defect in the mask inspection result. On the other hand, the die A is determined to be non-defective as a result of the re-inspection the defect is not stored in the mask inspection result.

Figure 7:
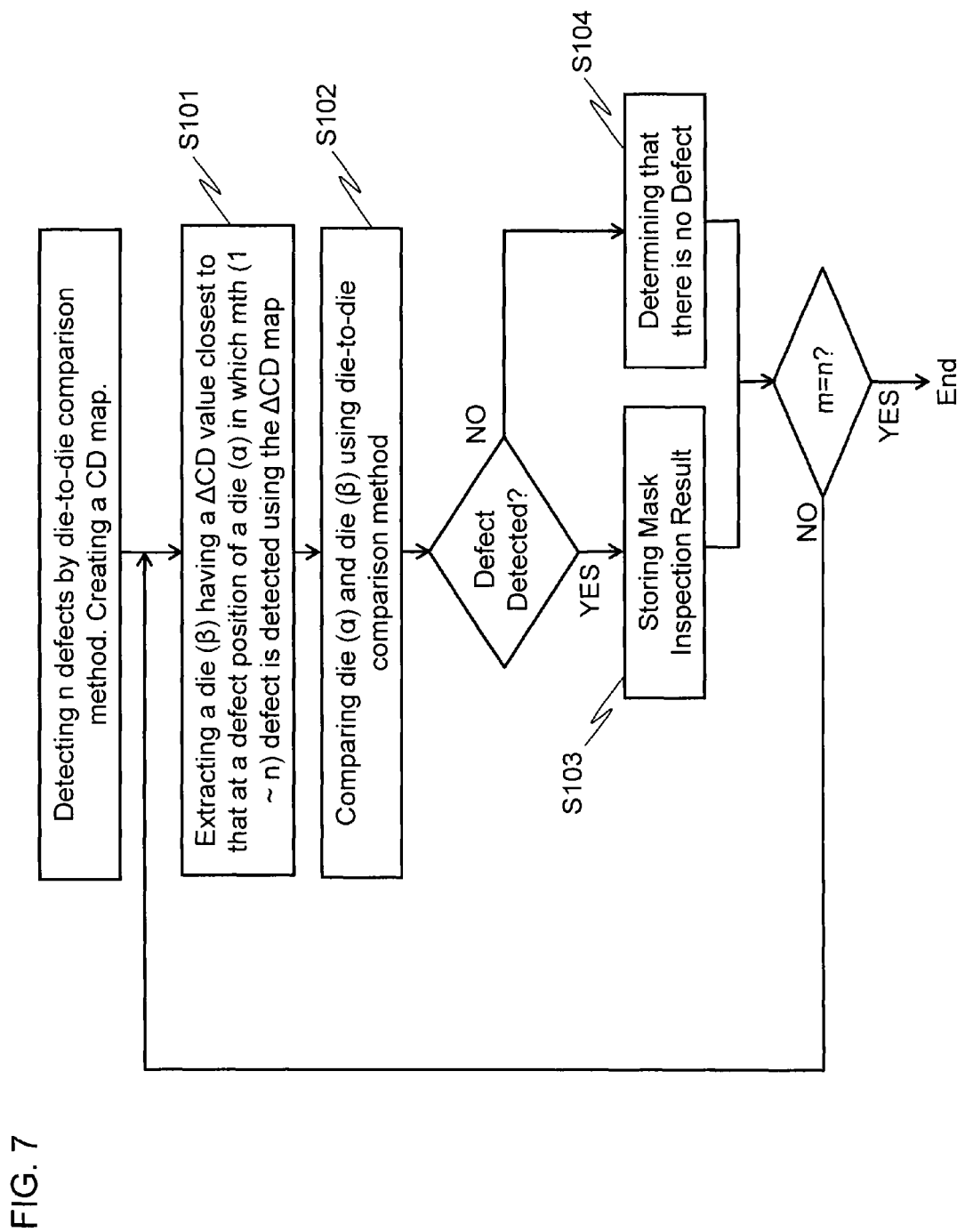
FIG. 7 is a flowchart illustrating a main part of an inspection method of the first embodiment.

FIG. 7 is a flowchart illustrating a main part of an inspection method of the first embodiment.

It is assumed that the first comparison unit performs the die-to-die comparison to detect n (n is an integer or 1 or more) defects with respect to the mask 101. In the first embodiment, the ΔCD map of the mask 101 is produced at this point.

The die having the dimension difference closest to that at the defect position of the die in which the defect is initially detected is extracted using the ΔCD map (S101) the control computer 110 in FIG. 1 can perform the processing in S101. For example, the control computer 110 extracts the die having the ΔCD value closest to that at the defect position using the ΔCD map output from the map producing circuit 126, and outputs the die to the second comparison unit. For example, assuming that the die A in FIG. 5 is one in which the defect is initially detected, the die having the ΔCD value closest to that at the defect position of the die A is searched, thereby extracting the die C. In the case that the die having the ΔCD value similar to that of the die A exists in addition to the die C, preferably the die located in the same direction as at least one of the X-axis direction and the Y-axis direction of the die A is preferentially extracted in consideration of the ease of movement of the XYθ-table 102. For example, the die having the same X-coordinate or Y-coordinate as the die A is preferentially extracted.

In the first embodiment, the die having the ΔCD map closest to that at the defect position of the die in which the defect is detected by the first comparison unit may be extracted from the ΔCD value obtained by the dimension measuring circuit 125 without producing the ΔCD map.

Then the second comparison unit of the comparison circuit 108 performs the die-to-die comparison to an optical image (α) of the die in which the defect is initially detected and an optical image (β) of the die extracted in S101 (S102). As a result of the comparison, when the defect is detected the data is stored as a mask inspection result in S103. For example, the control computer 110 stores the defect coordinates and the optical image, which is the basis of the defect determination, as a mask inspection result in the magnetic disk drive 109.

After that, the mask inspection result 205 is transmitted to a review tool 500 as illustrated in FIG. 2. A review process is an operation in which the operator determines whether the detected defect will become a practical problem. The defect information determined through the review process is also stored in the magnetic disk drive 109 of FIG. 1. When the defect to be corrected is confirmed by the review tool 500, the mask 101 is transmitted to a repair apparatus 600, that is, the external device of the inspection apparatus 100 together with a defect information list 207. Because a correction method depends on whether the defect is projected or recessed, a defect type including the distinction between the projection and the recess and the defect coordinate are added to the defect information list 207.

On the other hand, in the case that the defect is not detected as a result of the comparison in S102, the control computer 110 determines that the defect detected by the first comparison unit is not the defect, but does not store the defect in the mask inspection result (S104) the control computer 110 may store the result of the first comparison unit with a proper name, and properly read the result of the first comparison unit on demand from the user who uses the inspection apparatus 100.

Then the die in which the second defect is detected is subjected to the similar process. After determining whether the defect is stored in the mask inspection result by the re-inspection with respect to the die in which the m-th defect is detected, the control computer 110 determines whether the die in which the n-th defect is detected, namely, the die in which the final defect is detected based on whether m is n. When m is n the series of processes is ended because the comparison to the die having the ΔCD value closest to that at the defect position is performed to all the defects.

A sequence to re-inspect the n defects through the processes in FIG. 7 is not limited to the sequence in which the defect is detected. For example, the last detected defect may be the first defect to be re-inspected, and the first detected defect may be the last defect to be re-inspected. Alternatively, the sequence may be decided in consideration of moving efficiency of the XYθ-table.

According to the first embodiment, the dies having the similar dimension differences are re-inspected, so that the comparison can be performed while the influence of the difference between the dimension distributions is minimized. Therefore, because the defect that originally needs not to be detected is removed from the mask inspection result, the number of defects that is reviewed by the operator decreases thus shortening the inspection time. Because the number of defects described in the defect information list is also decreased, the production yield of the mask can be improved.

Embodiment 2

In the first embodiment, whether the die has the defect to be detected is determined by comparing the die in which the defect is detected to the die having the dimension difference closest to that at the defect position. On the other hand, in a second embodiment, the die having the close distribution of dimension difference or dimension ratio is searched to perform the re-inspection with respect to all the dies. Therefore, the defect to be detected can be prevented from being missed, and the problem in the shape or line widths, which is not required to be detected as the defect, can be prevented.

The inspection method according to the present embodiment will be described. This inspection method is performed using the inspection apparatus 100 of FIG. 1.

The inspection method according to the present embodiment includes the optical image acquisition process, the die-to-die comparison process, the dimension measuring process, and the map creating process. These processes are similar to the embodiment 1 therefore a repeated explanation will be omitted.

Figure 8:
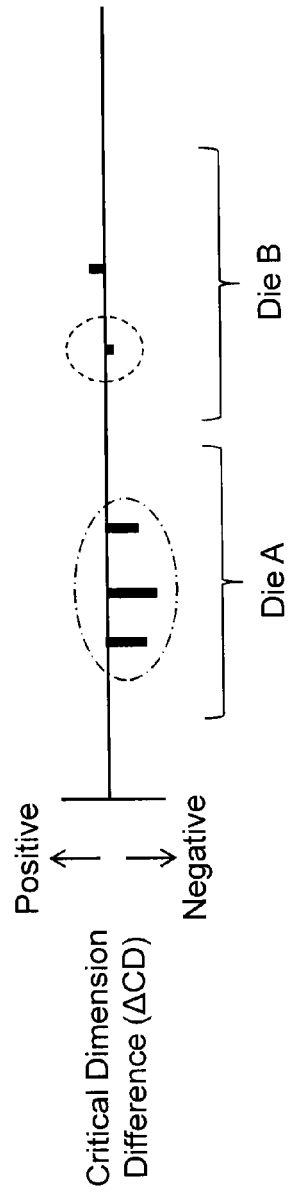
FIG. 8 is a view illustrating the dimension distribution corresponding to the section along a line X-X' in FIG. 5.
Figure 9:
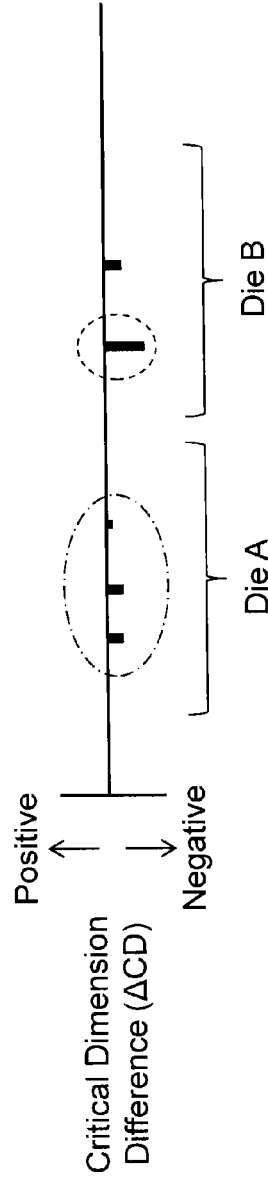
FIG. 9 is a view illustrating the dimension distribution corresponding to the section along a line X-X' in FIG. 5.

FIGS. 8 and 9 are views illustrating the dimension distribution corresponding to the section along a line X-X' in FIG. 5. In FIGS. 6, 8, and 9, a horizontal axis has the same scale, and an origin is positioned at the same position.

FIG. 8 illustrates the critical dimension difference (ΔCD) of the pattern measured by the dimension measuring circuit. In FIG. 8, an absolute value of the critical dimension difference (ΔCD) in die B in the portion surrounded by the broken line is smaller than absolute values of the critical dimension differences (ΔCD) at the remaining four points. Accordingly, the point in the broken line seems not to be the defect at a glance. On the other hand, the absolute values of the critical dimension differences (ΔCD) in the portion surrounded by an alternate long and short dash line is larger than the absolute value of the critical dimension difference (ΔCD) at the remaining two points. Accordingly, the points in the alternate long and short dash line seem to be the defect in the die A.

However, as can be seen from FIG. 6, the surrounding of the portion surrounded by the broken line (P2) is the region where the dimension difference becomes positive. That is, the line width in the surrounding area is larger than the reference value. On the other hand, because the dimension difference in the portion surrounded by the broken line becomes the negative value, the portion surrounded by the broken line has the line width that is smaller than the surrounding area. FIG. 9 illustrates a ΔCD value based on CD values measured after the dimension bias, that is, the dimension difference from the reference value of the line width in the surrounding area, is removed. As can be seen from FIG. 9, the absolute values of the critical dimension difference (ΔCD) in the portion surrounded by the broken line is larger than the remaining four points, the portion surrounded by the broken line is unusually small compared with the surrounding area, and the portion surrounded by the broken line should therefore be detected as a defect.

On the other hand, as can be seen from FIG. 6, the surrounding area of the portion surrounded by the dot dash line (P1) in FIG. 8 is the region where the dimension difference becomes negative. Accordingly, in FIG. 8, the dimension difference of the portion indicates the large negative value as a result of the addition of the tendency of the line width distribution in the region. In FIG. 9, although the critical dimension difference (ΔCD) of the portion surrounded by the dot dash line (P1) has the negative value, the dimension difference falls within the acceptable range, and the point should not be detected as the defect.

According to the first embodiment, even if the portion surrounded by the alternate long and short dash line is detected as the defect by the comparison between the die A and the die B in FIG. 8, the defect is re-inspected by the comparison to another die, and the defect can finally be removed from the mask inspection result. However, in the comparison between the die A and the die B, because the portion surrounded by a broken line is not detected as the defect, there is a risk of missing the defect that should originally have been detected.

For this reason, in the second embodiment, after the usual die-to-die comparison is performed, the die having the ΔCD value distribution closest to that of each die is extracted using the ΔCD map, and subjected to the die-to-die comparison to each die again.

Figure 10:
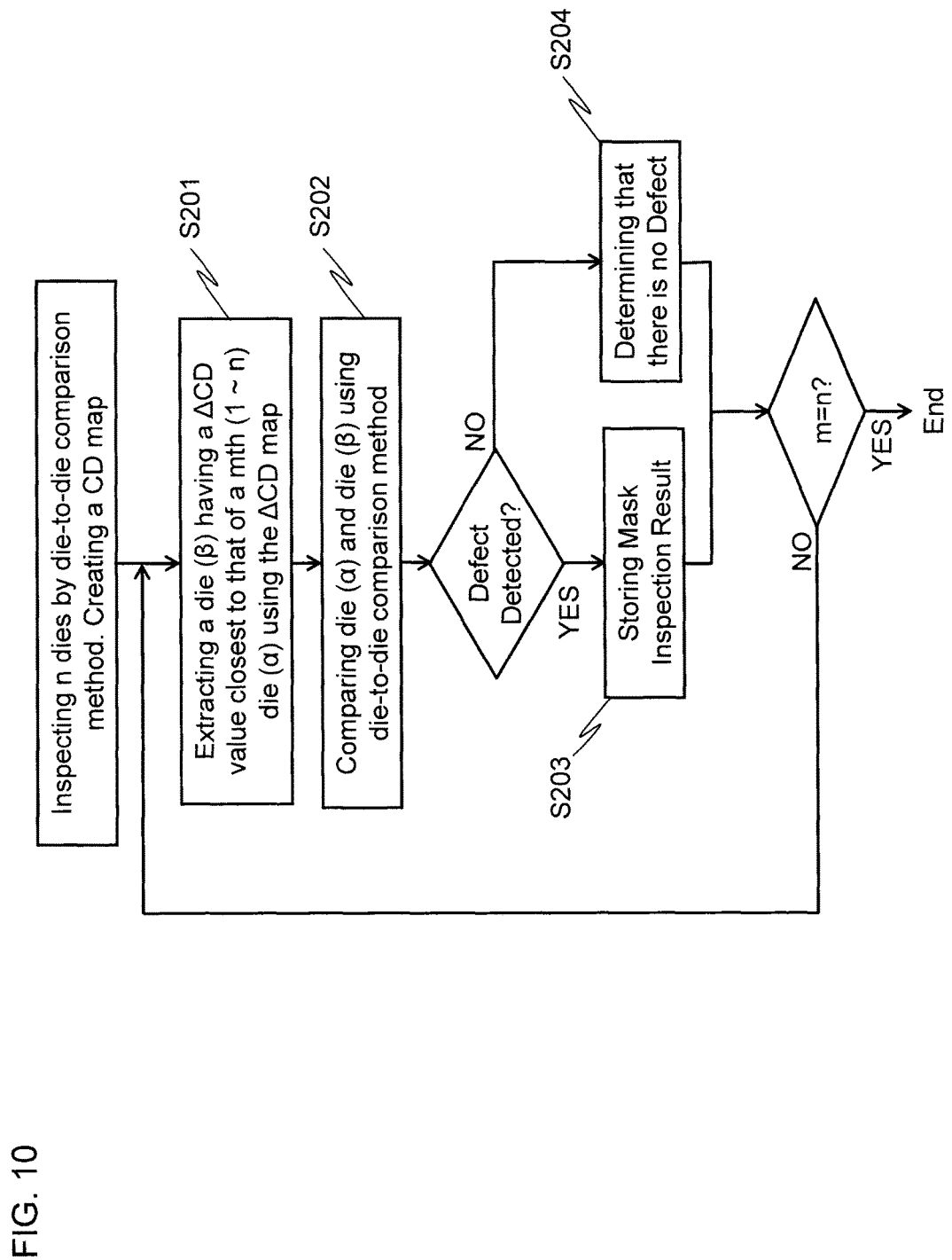
FIG. 10 is a flowchart illustrating a main part of an inspection method of the second embodiment.

FIG. 10 is a flowchart illustrating a main part of an inspection method of the second embodiment. Because the inspection method of the second embodiment can be performed using the inspection apparatus 100 in FIG. 1, the inspection method will be described with reference to FIG. 10 together with FIGS. 1 and 2.

The mask acquisition data 204 of the mask 101 acquired in the optical image acquisition process is transmitted from the sensor circuit 106 to the comparison circuit 108. The comparison circuit 108 includes the first comparison unit and the second comparison unit. In the present embodiment, the first comparison unit compares mask acquisition data 204 to each other using the die-to-die method.

The ΔCD map of the mask 101 is produced from the mask acquisition data 204. For example, the dimension measuring circuit 125 measures the dimension of the pattern of the mask 101 while the optical image of the mask 101 is acquired. Alternatively, for example, the dimension measuring circuit 125 may measure the dimension of the pattern while the comparison circuit 108 performs the inspection the ΔCD value obtained by the dimension measuring circuit 125 is transmitted to the map producing circuit 126 that is of the dimension distribution acquisition unit. Based on the ΔCD value, the map producing circuit 126 produces the critical dimension difference map (ΔCD map) of the pattern line width in the plane of the mask 101. The ΔCD map is stored in the magnetic disk drive 109.

In the present embodiment, the inspection apparatus 100 does not necessarily include the map producing circuit 126, but the dimension measuring circuit 125 may have the map producing function, or the map may be produced by an external computer.

As shown in FIG. 10, the die having the distribution of (ΔCD) values closest to the ΔCD values of the first die is extracted using the ΔCD map (S102) the control computer 110 in FIG. 1 can perform the processing in S101. As one example, the control computer 110 extracts the die having the ΔCD value closest to the defect position using the ΔCD map output from the map producing circuit 126, and outputs the die to the second comparison unit. In the case that the die having the ΔCD value similar to that of the die A exists in addition to the die C, preferably the die located in the same direction as at least one of the X-axis direction and the Y-axis direction of the die A is preferentially extracted in consideration of the ease of movement of the XYθ-table 102. For example, the die having the same X-coordinate or Y-coordinate as the die A is preferentially extracted.

In the first embodiment, the die having the ΔCD map closest to that at the defect position of the die in which the defect is detected by the first comparison unit may be extracted from the ΔCD value obtained by the dimension measuring circuit 125 without producing the ΔCD map.

Then the second comparison unit of the comparison circuit 108 performs the die-to-die comparison to an optical image (α) of the die in which the defect is initially detected and an optical image (β) of the die extracted in S201 (S202). As a result of the comparison, when the defect is detected the data is stored as a mask inspection result in S203. For example, the control computer 110 stores the defect coordinates and the optical image, which is the basis of the defect determination, as a mask inspection result in the magnetic disk drive 109. That is, the coordinate of the defect detected by the die-to-database comparison method and the optical image and reference image, which are the basis of the defect determination, are stored as the mask inspection result 205 in the magnetic disk drive 109.

After that, the mask inspection result 205 is transmitted to a review tool 500 as illustrated in FIG. 2. A review process is an operation in which the operator determines whether the detected defect will become a practical problem. For example, the operator visually determines whether the defect needs to be corrected by comparing the reference image, that is the basis for the defect determination, to the optical image including the defect. The defect information determined through the review process is also stored in the magnetic disk drive 109 of FIG. 1. As illustrated in FIG. 2, when the defect to be corrected is confirmed by the review tool 500, the mask 101 is transmitted to a repair apparatus 600, that is, the external device of the inspection apparatus 100 together with a defect information list 207. Because a correction method depends on whether the defect is projected or recessed, a defect type including the distinction between the projection and the recess and the defect coordinate are added to the defect information list 207.

On the other hand, in the case that the defect is not detected as a result of the comparison in S202, the control computer 110 determines that the defect detected by the first comparison unit is not the defect, but does not store the defect in the mask inspection result (S204) the control computer 110 may store the result of the first comparison unit with a proper name, and properly read the result of the first comparison unit on demand from the user who uses the inspection apparatus 100.

Then the die in which the second defect is detected is subjected to the similar process. After determining whether the defect is stored in the mask inspection result by the re-inspection with respect to the die in which the m-th defect is detected, the control computer 110 determines whether the die in which the n-th defect is detected, namely, the die in which the final defect is detected based on whether m is n. When m is n the series of processes is ended because the comparison to the die having the ΔCD value closest to that at the defect position is performed to all the defects.

A sequence to re-inspect the defects through the processes in FIG. 10 is not limited to the sequence in which the defect is detected. For example, the last detected defect may be the first defect to be re-inspected, and the first detected defect may be the last defect to be re-inspected. Alternatively, the sequence may be decided in consideration of moving efficiency of the XYθ-table.

The die having the ΔCD value distribution similar to that of each die is extracted with respect to all the dies, and the re-inspection is performed to the dies having the similar ACID value distributions. Therefore, the comparison is performed while the influence of the difference between the dimension distributions is minimized, so that the defect that is not required to be detected can be removed from the mask inspection result. Therefore, the number of defects that is reviewed by the operator decreases thus shortening the inspection time. Because the number of defects described in the defect information list is also decreased, the production yield of the mask can be improved. The re-inspection is performed to all the dies while the influence of the difference between the dimension distributions is minimized, so that the defect to be originally detected can be prevented from being missed.

The present invention is not limited to the embodiments described and can be implemented in various ways without departing from the spirit of the invention.

In both embodiments, the map produced by the map producing circuit 126 can be used to transfer the pattern on the mask 101 to the wafer. For example, when the exposure apparatus that transfers the pattern on the mask 101 to the wafer can input the irradiation energy (dose) as the map, the map produced by the map producing circuit 126 is input to the exposure apparatus, and converted into the map of the irradiation energy, which allows the line width to be homogeneously transferred to the wafer. For example, in the position where the dimension difference becomes negative in the mask 101, namely, the position where the line width is smaller, the irradiation energy is adjusted such that the pattern transferred to the wafer is larger. On the other hand, in the position where the dimension difference becomes positive in the mask 101, namely, the position where the line width is larger, the irradiation energy is adjusted such that the pattern transferred to the wafer is smaller. Therefore, the line width of the pattern transferred to the wafer is homogenized even in the mask in which the pattern has the dimension distribution.

The above description of the present embodiment has not specified apparatus constructions, control methods, etc., which are not essential to the description of the invention, since any suitable apparatus construction, control methods, etc. can be employed to implement the invention. Further, the scope of this invention encompasses all inspection methods and inspection apparatuses employing the elements of the invention and variations thereof, which can be designed by those skilled in the art.

What is claimed is:

1. An inspection method comprising:
    acquiring a plurality of optical images of dies in a sample in which the dies each having a repetitive pattern are provided;
    comparing the optical images to each other by a die-to-die method and detecting an optical image of a die having a pattern defect;
    obtaining at least one of a dimension difference and a dimension ratio between the repetitive pattern in the detected optical image and the repetitive patterns in other optical images to be referenced in the die-to-die method;
    extracting an optical image of a die having the dimension difference or dimension ratio closest to the die having the pattern defect at a pattern defect position of the repetitive pattern in the detected optical image; and
    comparing the detected optical image of the die having the pattern defect and the extracted optical image of the die having the dimension difference or dimension ratio closest to the die having the pattern defect at the pattern defect position of the repetitive pattern by the die-to-die method, storing information on the pattern defect when the defect is redetected from the detected optical image, and determining that the pattern defect does not exist in the detected optical image when the pattern defect is not redetected from the detected optical image,
    wherein, in acquiring the optical images of the dies in the sample, the sample is virtually divided into a plurality of stripes along an X-axis direction or a Y-axis direction, and the sample is placed on an XY-table movable in the X-axis direction and the Y-axis direction, the XY-table is moved such that the stripes are continuously scanned one by one, and
    in extracting the die having the dimension difference or dimension ratio closest to the die having the pattern defect at the pattern defect position of the repetitive pattern in the detected optical image, a die located in a same direction as at least one of the X-axis direction and the Y-axis direction as the die of the detected optical image is preferentially extracted.

2. The inspection method according to claim 1, further obtaining a dimension distribution of the repetitive pattern from at least one of the dimension difference and the dimension ratio,
    wherein the die having the dimension difference or dimension ratio closest to the die having the pattern defect at the pattern defect position is extracted using the dimension distribution.

3. An inspection method comprising:
    acquiring a plurality of optical images of dies in a sample in which the dies each having repetitive pattern are provided;
    comparing the optical images to each other by a die-to-die method;
    obtaining at least one of a dimension difference and a dimension ratio between the repetitive pattern in an optical image to be inspected and the repetitive pattern in other optical images to be referenced in the die-to-die method;
    extracting an optical image of a die having a closest distribution of the dimension difference or dimension ratio with respect to the repetitive pattern in the optical image to be inspected; and
    comparing the optical image to be inspected to extracted optical image of the die having the closest distribution of the dimension difference or dimension ratio by the die-to-die method, storing information on a pattern defect when the pattern defect is detected, and determining that the pattern defect does not exist when the pattern defect is not detected,
    wherein, in acquiring the optical images of dies in the sample, the sample is virtually divided into a plurality of strives along an X-axis direction or a Y-axis direction, and the sample is placed on an XY-table movable in the X-axis direction and the Y-axis direction the XY-table is moved such that the stripes are is continuously scanned one by one, and
    in extracting the die having the closest distribution of the dimension difference or dimension ratio, a die located in the same direction as the die in the optical image to be inspected with respect to at least one of the X-axis direction and the Y-axis direction is preferentially extracted.

4. The inspection method according to claim 3, further comprising the step of obtaining a dimension distribution of the repetitive pattern from at least one of the dimension difference and the dimension ratio,
    wherein the die having the closest distribution of the dimension difference or dimension ratio is extracted using the dimension distribution.

5. The inspection method according to claim 3, wherein the dimension difference is a difference in line width between the repetitive patterns or a difference in inter-pattern distance between the repetitive patterns.

6. The inspection method according to claim 3, wherein the dimension ratio is a ratio of line width between the repetitive patterns or a ratio of inter-pattern distance between the repetitive patterns.

7. The inspection method according to claim 1, wherein the dimension difference is a difference in line width between the repetitive patterns or a difference in inter-pattern distance between the repetitive patterns.

8. The inspection method according to claim 1, wherein the dimension ratio is a ratio of line width between the repetitive patterns or a ratio of inter-pattern distance between the repetitive patterns.

9. An inspection apparatus comprising:
    an optical image acquisition unit that acquires a plurality of optical images of dies in a sample in which the dies each having a repetitive pattern are provided;

a first comparison unit that detects an optical image of a die having a pattern defect by comparing the optical images output from the optical image acquisition unit to each other by a die-to-die method;

a dimension difference/dimension ratio acquisition unit that obtains at least one of a dimension difference and a dimension ratio between the repetitive pattern in the detected optical image and the repetitive patterns in other optical images to be referenced in the die-to-die method;

a second comparison unit that compares the detected optical image of the die having the pattern defect detected by the first comparison unit and the optical image of the die having the dimension difference or dimension ratio closest to the die having the pattern defect at the pattern defect position of the repetitive pattern in the detected optical image by the die-to-die method; and a controller that stores information on the pattern defect when the pattern defect is redetected from the detected optical image by the comparison in the second comparison unit, and determines that the pattern defect does not exist in the detected optical image when the pattern defect is not redetected from the detected optical image, wherein the sample is virtually divided into a plurality of stripes along an X-axis direction or a Y-axis direction, and the sample is placed on an XY-table movable in the X-axis direction and the Y-axis direction, the XY-table is moved such that the stripes are continuously scanned one by one, and a die located in a same direction as at least one of the X-axis direction and the Y-axis direction as the die of the detected optical image is preferentially extracted.

10. The inspection apparatus according to claim 9, further comprising a dimension distribution acquisition unit that obtains a dimension distribution of the repetitive pattern from at least one of the dimension difference and the dimension ratio, which are output from the dimension difference/dimension ratio acquisition unit, wherein the controller extracts the optical image of the die having the dimension difference or dimension ratio closest to the die having the pattern defect at the pattern defect position of the repetitive pattern by using the dimension distribution output from the dimension distribution acquisition unit and outputs to the second comparison unit.

* * * * *